June 26, 1923.
D. W. WOOD
CLUTCH
Filed July 29, 1921
1,460,303
2 Sheets-Sheet 2
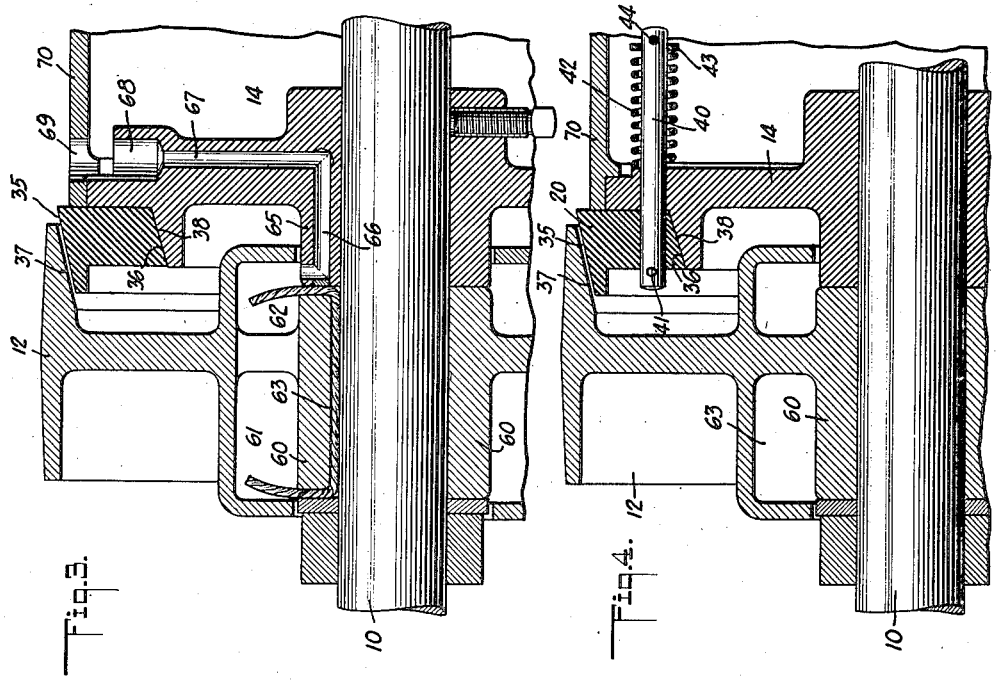
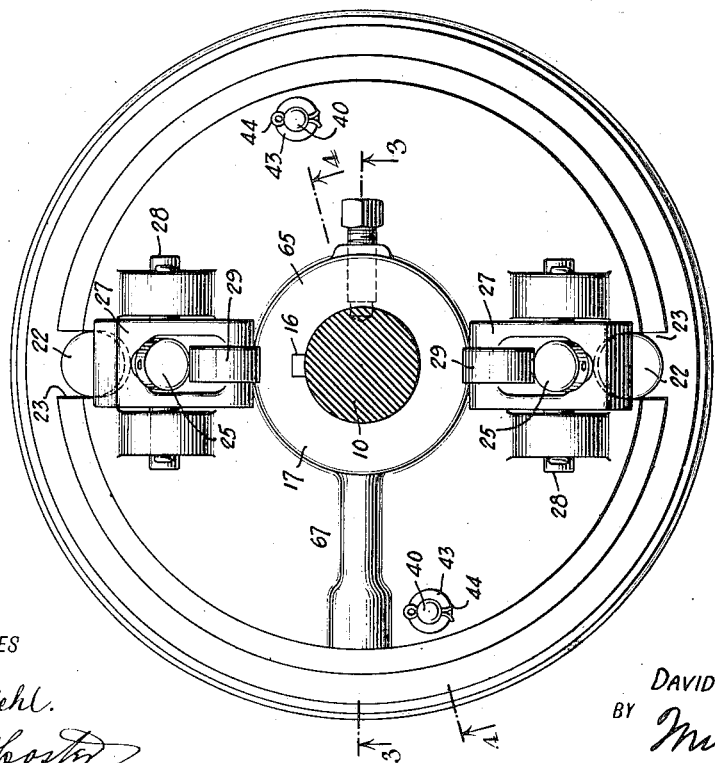
WITNESSES
INVENTOR
David W. Wood
BY
ATTORNEYS Patented June 26, 1923.

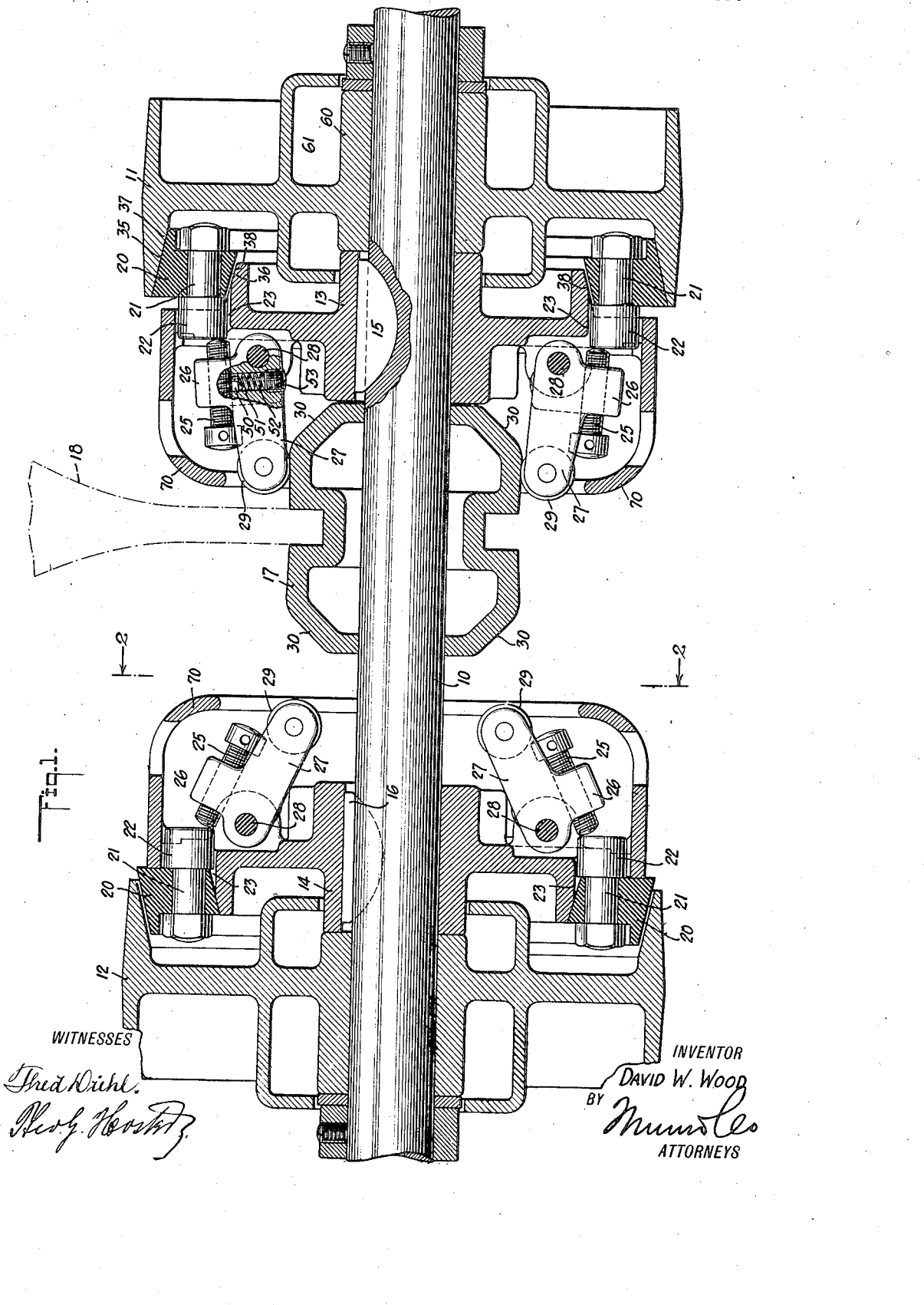

1,460,303

UNITED STATES PATENT OFFICE.

DAVID WILSON WOOD, OF BRAZIL, INDIANA.

CLUTCH.

Application filed July 29, 1921. Serial No. 488,435.

*To all whom it may concern:*

Be it known that I, DAVID W. WOOD, a citizen of the United States, and a resident of Brazil, in the county of Clay and State of Indiana, have invented a new and Improved Clutch, of which the following is a full, clear, and exact description.

The invention relates to cone type clutches, and its object is to provide a new and improved clutch arranged to insure accurate and quick coupling or releasing of the driving and driven members.

Another object is to provide a clutch more especially designed for use on the countershaft of high speed tooling machines to readily overcome the momentum of the driven machine when the clutch is thrown into reversing position thus reducing the wear of the working members to a minimum.

Another object is to render the clutch very effective when used for frequent reversing and when used on a countershaft even should the latter be sprung by the action of the tight belts or on account of improper alinement or other causes.

Another object is to dispense with the use of delicate toggle joints or other troublesome parts now frequently used in clutches of the cone type.

Another object is to permit of readily supplying the driven loose pulley with lubricant while running.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

Figure 1 is a longitudinal central section of the improved clutch as applied to a countershaft;

Fig. 2 is a transverse section of the same on the line 2—2 of Figure 1;

Figure 3 is a sectional plan view of the same on the line 3—3 of Figure 2; and

Figure 4 is a similar view of the same on the line 4—4 of Figure 2.

On the countershaft 10 are mounted two clutches for alternately driving the countershaft 10 in opposite directions. On the countershaft 10 are journaled two cone pulleys 11 and 12 driven by belts in opposite directions from other machinery, and on the said countershaft 10 are secured driven clutch members 13 and 14 by the use of suitable keys 15, 16, as plainly shown in Figure 1. The mechanisms for connecting the cone pulleys 11 and 12 with the clutch members 13 and 14 are alike in construction so that it suffices to describe but one in detail, it being understood that the clutch mechanisms are controlled by a shifting collar 17 slidably mounted on the countershaft 10 intermediate the clutch members 13 and 14. A shifting fork 18 engages the shifting collar 17 for moving the latter on the countershaft 10.

Intermediate the cone pulley 11 and the clutch member 13 and likewise between the cone pulley 12 and its clutch member 14 is arranged a floating ring 20 provided with studs 21 having their heads 22 projecting into cut-out portions or guideways 23 formed transversely on the peripheral face of the clutch member 13 to cause the ring 20 when driven by the corresponding pulley 11 or 12 to rotate the corresponding clutch member 13 or 14 and hence the countershaft 10 in the desired direction. The head 22 of each stud 21 is engaged by a screw 25 screwing in a nut 26 formed on a lever 27 fulcrumed at 28 on the outer side of the clutch member 13 or 14. On the free end of the lever 27 is journaled a friction roller 29 adapted to be engaged by the corresponding beveled end 30 of the shifting collar 17 to impart an outward swinging motion to the said lever to cause the screw 25 to move the stud 21 and with it the floating ring 20 in a longitudinal direction to engage the ring 20 with the corresponding pulley 11 or 12.

The ring 20 is provided with outer and inner beveled faces 35, 36, of which the outer face 35 is adapted to engage a corresponding beveled face 37 formed on the inner surface of the rim of the corresponding pulley 11 or 12, to insure a firm frictional contact between the floating ring 20 and the pulley 11 or 12. The inner beveled face 36 of the floating ring 20 is adapted to seat itself on a correspondingly beveled face 38 formed on the corresponding clutch members 13 and 14 to hold the floating ring 20 in a centered position when released from the corresponding pulley 11 or 12 (see the clutch mechanism to the left in Figure 1 and Figures 3 and 4).

In order to move the floating ring 20 into quick release position, that is, out of engagement with the corresponding pulley 11 or 12, use is made of one or more rods 40 mounted to slide longitudinally in the corresponding clutch member 13 or 14. A pin 41 (see Figure 4) is held on each rod 40 and engages the floating ring 20, and on the said rod 40 is coiled a spring 42 abutting with one end against the outer side of the clutch member 13 or 14 and resting with its other end on a washer 43 held in place on the rod 40 by a cotter pin 44 or other suitable means. It will be noticed that by the arrangement described the spring 42 tends to draw the floating ring 20 out of engagement with the corresponding pulley 11 or 12 and onto its seat formed by the beveled face 38 of the clutch member 13 or 14.

The operation is as follows:

When the shifting collar 17 is moved from its normal neutral position, say to the right, into the position shown in Figure 1, then the clutch mechanism for the pulley 11 and the clutch member 13 is actuated, that is, the levers 27 are swung outward and by their screws 25 move the studs 21 and the floating ring 20 to the right thus engaging the beveled face 35 of this clutch ring with the beveled face 37 of the pulley 11, and hence the rotary motion of this pulley 11 is transmitted by the floating ring 20 and the studs 21 to the clutch member 13 to rotate the countershaft 10 in one direction. When the shifting collar 17 is moved from the right to the left back into neutral position then the levers 27 are released and allowed to swing inward thus permitting the spring-pressed rods 40 to shift the floating ring 20 from the right to the left, that is, moving it out of engagement with the pulley 11 thereby stopping the rotary motion of the floating ring 20 and the clutch member 13. On moving the shifting collar 17 from neutral position to the left then the clutch mechanism for the pulley 12 and the clutch member 14 is actuated in the same manner as above described, but as the pulley 12 rotates in an opposite direction from that of the pulley 11 it is evident that the countershaft 10 is now rotated in a reverse direction.

It will be noticed that by the use of the floating ring 20 an accurate and quick coupling and releasing of the driving and driven members is obtained even in case the countershaft 10 is sprung or out of alinement. It will also be noticed that the wear between the working parts, particularly the pulleys and the clutch members, is reduced to a minimum. When the clutch is used for machine tool drive it readily overcomes the momentum of the driven machine particularly when the clutch is thrown into reversing position.

It will be noticed that by the use of the screws 25 an accurate adjustment can be had between the levers 27 and the heads 22 of the studs 21 to insure proper functioning of the clutch mechanism. In order to prevent the screw rods 25 from jarring loose in their nuts 26 use is preferably made of a locking disk 50 mounted in a bore 51 formed in the lever 27. The disk 50 is pressed on by a spring 52 held in the said bore and seated in a screw 53 screwing in the end of the bore. It will be noticed that by the use of the spring 52, the locking disk 50 is pressed in firm contact with the screw 25 to hold the same against accidental turning.

In order to permit lubricating of the pulley 11 or 12 while running use is made of an oiling system arranged as follows: In the hub 60 of the pulley 11 or 12 is formed an oil well 61 into which project the ends of a wick 62 extending along a recess 63 formed in the inner surface of the hub 60. This wick 62 is in contact with the countershaft 10 and delivers the oil from the oil well 61 to the shaft and the hub 60. The hub 65 of the clutch member 13 or 14 extends into the oil well 61 and is provided with a passage 66 for delivering oil to the said oil well 61 to fill the latter. The passage 66 terminates in a passage 67 formed in the web of the corresponding clutch member 13 or 14, and the outer end of this passage 67 is provided with an enlargement 68 into which lubricant is poured from an oil can or the like by way of an opening 69 formed in a housing 70 attached to the clutch member 13 or 14 and enclosing the corresponding clutch mechanisms. It will be noticed that when the clutch member 13 or 14 is at a standstill while the pulleys 11 and 12 are running, oil can be supplied by way of the passages 67, 66 to the corresponding oil well 61 to fill the same.

Having thus described my invention, I claim as new and desire to secure by Letters Patent:

1. In a clutch, a loose rotating pulley presenting a flaring face, a clutch member to be driven presenting a beveled face, a floating member presenting parallel inclined inner and outer faces rotating with said clutch member, the inner face of said floating member normally engaging said beveled face, and the outer face engaging said flaring face when said floating member is moved into engagement with said pulley, and spring pressed releasing means connected with the floating member to move the latter out of engagement with said pulley.

2. In a clutch, a shaft, a clutch member having a beveled face rotating with said shaft, a pulley having a flaring face mounted to turn loosely on the shaft, a floating member having faces to mate with said beveled and flaring faces rotating with said clutch member, shifting adjustable means pivotally mounted on the said clutch member and engaging the said floating member to move the latter into engagement with the pulley, and spring pressed releasing means slidably mounted on said clutch member and engaging the said floating member.

3. In a clutch, a cone pulley provided with a beveled inner face, a clutch member having a beveled face, a floating ring rotating with the said clutch member and having outer and inner beveled faces adapted to optionally engage alternatively either of said beveled faces on the said pulley and clutch member, and means for moving the said floating ring.

4. In a clutch, a shaft, a pulley mounted to rotate loosely on the said shaft and having a hub provided with an annular oil well for delivering oil to the shaft, and a clutch member having a hub secured to the said shaft and having an oil delivery passage opening into the said oil well.

5. In a clutch, a shaft, a clutch member having a beveled face fixed to the shaft, a pulley having a flaring face loosely mounted on said shaft adjacent said clutch member, a floating member having faces to mate with said beveled and flaring faces rotating with said clutch member, and shifting means mounted on said clutch member engaging said floating member to move the latter into engagement with the said pulley.

DAVID WILSON WOOD.